(12) United States Patent
Wang et al.

(10) Patent No.: US 10,853,737 B2
(45) Date of Patent: Dec. 1, 2020

(54) MACHINE-LEARNING CLASSIFIER BASED ON COMPARATORS FOR DIRECT INFERENCE ON ANALOG SENSOR DATA

(71) Applicants: Zhuo Wang, Princeton, NJ (US); Naveen Verma, Princeton, NJ (US)

(72) Inventors: Zhuo Wang, Princeton, NJ (US); Naveen Verma, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 1066 days.

(21) Appl. No.: 15/049,817

(22) Filed: Feb. 22, 2016

(65) Prior Publication Data
US 2017/0243124 A1    Aug. 24, 2017

(51) Int. Cl.
*G06N 20/00* (2019.01)
(52) U.S. Cl.
CPC .................................. *G06N 20/00* (2019.01)
(58) Field of Classification Search
CPC ...................................................... G06N 20/00
See application file for complete search history.

(56) References Cited

U.S. PATENT DOCUMENTS

| | | | | |
|---|---|---|---|---|
| 5,093,803 A * | 3/1992 | Howard | ................ | G06N 3/0635 708/801 |
| 5,537,512 A * | 7/1996 | Hsia | ...................... | G06N 3/0635 706/39 |
| 2003/0123646 A1 * | 7/2003 | Srinivasan | .......... | H03M 1/0697 379/399.01 |
| 2009/0304290 A1 * | 12/2009 | Fukaya | .............. | G06K 9/00228 382/224 |
| 2010/0245604 A1 * | 9/2010 | Ohmiya | ................... | G03B 5/00 348/208.99 |

OTHER PUBLICATIONS

Khachab, et al., "A Nonlinear CMOS Analog Cell for VLSI Signal and Information Processing", IEEE Journal of Solid-State Circuits, vol. 26, No. 22, Nov. 1991 (Year: 1991).*

(Continued)

*Primary Examiner* — Robert A Cassity
*Assistant Examiner* — Tsu-Chang Lee
(74) *Attorney, Agent, or Firm* — Meagher Emanuel Laks Goldberg & Liao, LLP

(57) ABSTRACT

A weak binary classifier configured to receive an input signal for classification and generate a classification output is disclosed. The weak binary classifier includes a plurality of weighting amplifier stages, each weighting amplifier stage being configured to receive the input signal for classification and a weighting input derived from a classifier model and generate a weighted input signal, the plurality of weighting amplifier stages being configured to generate a plurality of positive weighted input signals coupled to a positive summing node and a plurality of negative weighted input signals coupled to a negative summing node. The weak binary classifier also includes a comparator having a non-inverting input coupled to the positive summing node and an inverting input coupled to the negative summing node and being configured to generate a weak classification output based on the plurality of weighted input signals.

20 Claims, 11 Drawing Sheets

(56) References Cited

OTHER PUBLICATIONS

Petersen, et. al., "Constrained Quadratic Programming Techniques for Control Allocation", 2014 IEEE Transactions on Control System Technology, vol. 14, No. 1, Jan. 2006 (Year: 2006).*
Wang, et. al., "Error-Adaptive Classifier Boosting (EACB): Exploiting Data-Driven Training for Highly Fault-Tolerant Hardware", 2014 IEEE International Conference on Acoustic, Speech and Signal Processing (ICASSP), May 4-9, 2014 (Year: 2014).*
Sepke, T. et al, "Noise Analysis for Comparator-Based Circuits" IEEE Transactions on Circuits and Systems I: Regular Papers, vol. 56, No. 3, (Mar. 2009).
Wang, Z. et al "Error Adaptive Classifier Boosting (EACB): Leveraging Data-Driven Training Towards Hardware Resilience for Signal Inference" EEE Transactions on Circuits and Systems I: Regular Papers, vol. 62, No. 4, (Apr. 2015).
Zhang, J. et al. "A Matrix-Multiplying ADC Implementing a Machine-Learning Classifier Directly with Data Conversion." EEE International Solid-State Circuits Conference, Session 18, (Feb. 25, 2015).

\* cited by examiner

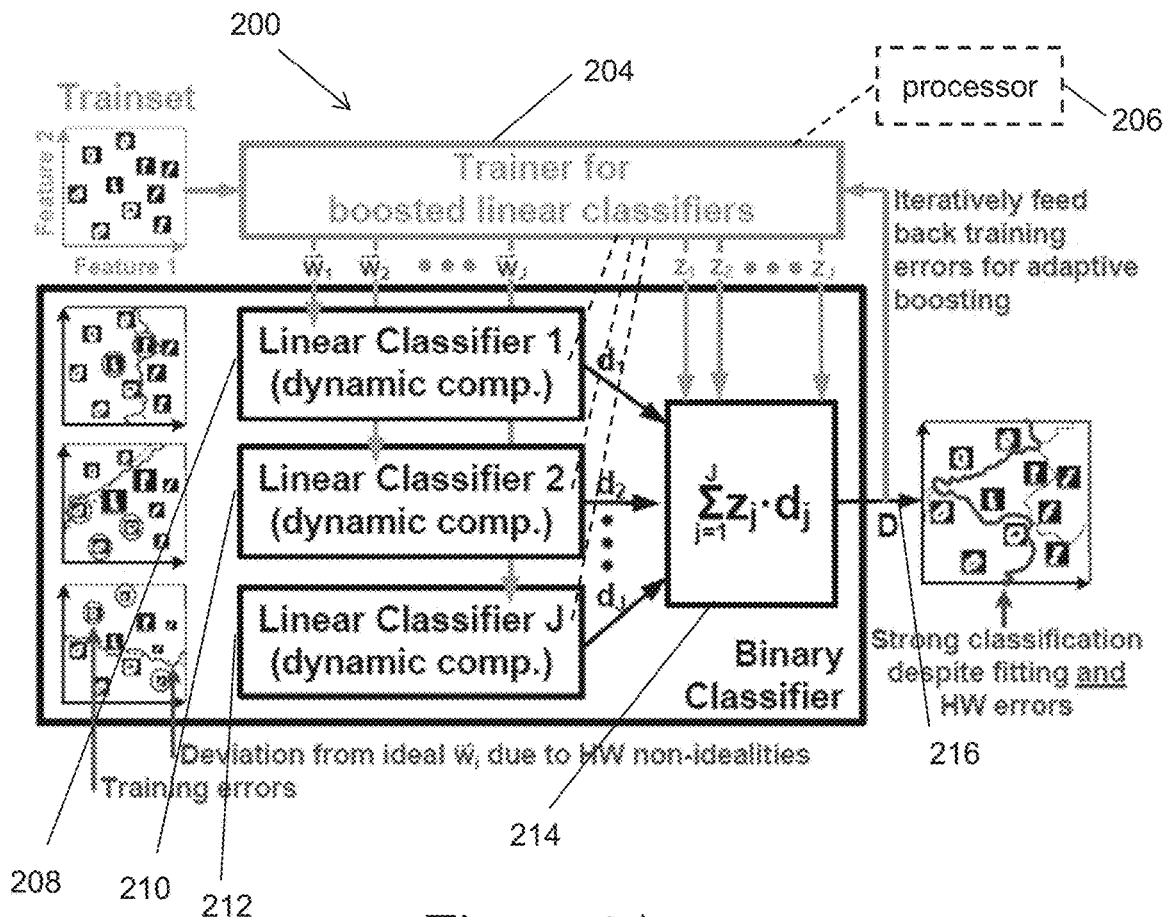
Figure 3A
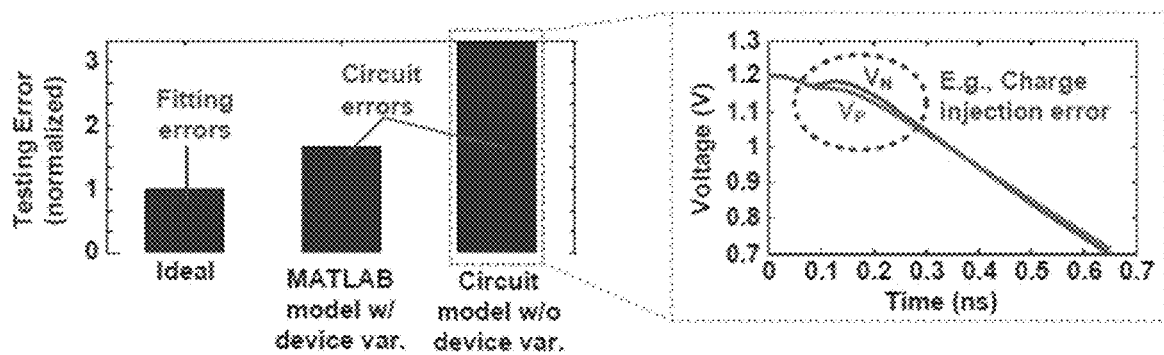
Figure 3B
Figure 3C

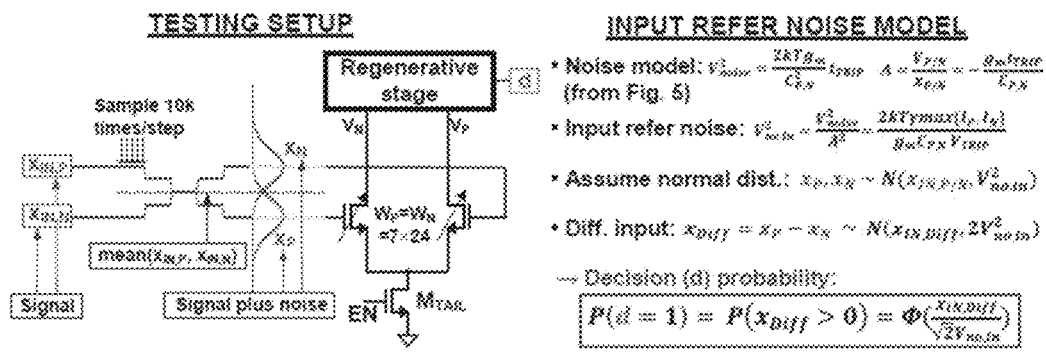
Figure 10A
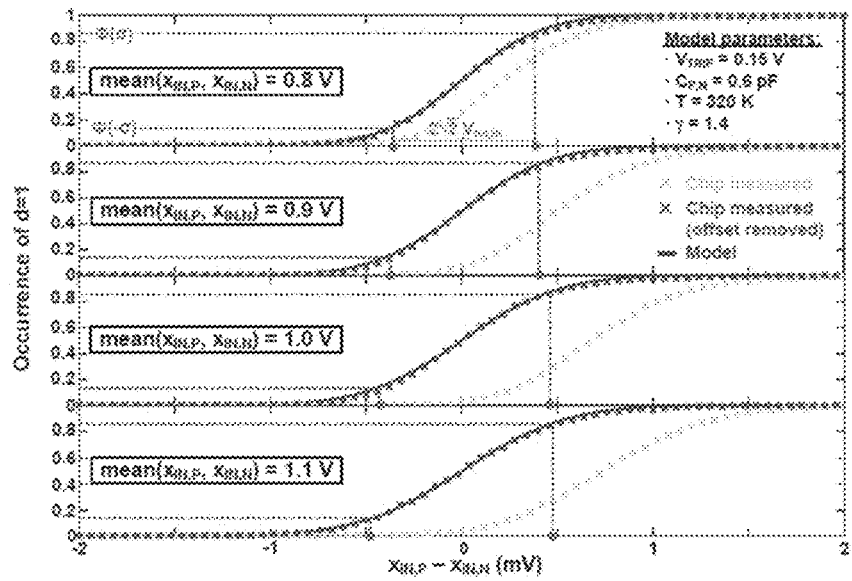
Figure 10B
Figure 10C
Figure 10D
Figure 10E

MACHINE-LEARNING CLASSIFIER BASED ON COMPARATORS FOR DIRECT INFERENCE ON ANALOG SENSOR DATA

TECHNICAL FIELD

This invention relates generally to machine-learning classifiers and in particular machine-learning classifiers based on dynamic comparators for direct inference from analog sensor data.

BACKGROUND

Embedded sensors are driving the need for ultra-low-energy devices that can provide high-quality inferences (e.g., classification) from signals. Machine learning plays a key role as it enables data-driven methods for modeling signals too complex to model analytically. Prior classification systems employ a basic architecture that receives an analog signal for classification. The signal is amplified via an instrumentation amplifier. The amplified signal is fed into an analog to digital converter (ADC). The ADC output is then subjected to a series of digital multiply and accumulate operations (MAC). The result of these amplification, ADC and MAC operations is a classification output. The classification output may be a single bit (1b), e.g., does the input signal match a specific pattern or not. Ensemble systems may be constructed to yield a multi-bit classification output. Analysis of systems using this traditional architecture reveals that the instrumentation amplifiers, ADC and large number of digital MAC operations all contribute significantly to the energy consumption of devices using such an implementation. What is needed is a new hardware architecture for generating a classification output with reduced circuitry complexity and reduced power consumption.

SUMMARY OF THE INVENTION

A weak binary classifier configured to receive an input signal for classification and generate a classification output is disclosed. The weak binary classifier includes a plurality of weighting amplifier stages, each weighting amplifier stage being configured to receive the input signal for classification and a weighting input derived from a classifier model and generate a weighted input signal, the plurality of weighting amplifier stages being configured to generate a plurality of positive weighted input signals coupled to a positive summing node and a plurality of negative weighted input signals coupled to a negative summing node. The weak binary classifier also includes a comparator having a non-inverting input coupled to the positive summing node and an inverting input coupled to the negative summing node and being configured to generate a weak classification output based on the plurality of weighted input signals.

Each weighting amplifier stage may have an associated polarity switch configured to couple the weighted input signal of its associated weighting amplifier to the positive or negative summing node based on a polarity of the weighting input. The weighting input may be derived from the classifier model is a multi-bit weighting input. The weighting amplifier stage may have positive and negative weighting inputs configured to receive the multi-bit input weighting input. Each weighting amplifier stage may include a positive weighting amplifier and a negative weighting amplifier associated with a bit position of the weighting input.

A strong binary classifier is also disclosed. The strong binary classifier includes a plurality of weak binary classifiers and a digital voter having a summing input coupled to the weak classification output of each weak binary classifier, the digital voter being configured to generate a strong binary classification output. The strong binary classifier may include a trainer configured to generate weighting values for each weak binary classifier. The trainer may be configured to generate a first weighting input for a first weak binary classifiers and subsequent weighting inputs for subsequent weak binary classifiers, the subsequent weighting inputs are configured to correct misclassifications associated with the first weighting input. The trainer may be configured to correct to non-idealities associated with the weak binary classifier. The trainer may be configured to perform Error Adaptive Classifier Boosting (EACB).

A method of performing classification using a weak binary classifier is also disclosed. The method includes providing a plurality of weighting amplifier stages, each weighting amplifier stage being configured to receive the input signal for classification and a weighting input derived from a classifier model and generate a weighted input signal, the plurality of weighting amplifier stages being configured to generate a plurality of positive weighted input signals coupled to a positive summing node and a plurality of negative weighted input signals coupled to a negative summing node. The method also includes providing a comparator having a non-inverting input coupled to the positive summing node and an inverting input coupled to the negative summing node and being configured to generate a weak classification output based on the plurality of weighted input signals.

Each weighting amplifier stage may have an associated polarity switch configured to couple the weighted input signal of its associated weighting amplifier to the positive or negative summing node based on a polarity of the weighting input. The weighting input may be derived from the classifier model is a multi-bit weighting input. The weighting amplifier stage may have positive and negative weighting inputs configured to receive the multi-bit input weighting input. Each weighting amplifier stage may include a positive weighting amplifier and a negative weighting amplifier associated with a bit position of the weighting input.

A method of performing strong binary classification using a plurality of weak binary classifiers is also disclosed. The strong binary classifier includes a plurality of weak binary classifiers and a digital voter having a summing input coupled to the weak classification output of each weak binary classifier, a digital voter is provided, the digital being configured to generate a strong binary classification output. The strong binary classifier may include a trainer configured to generate weighting values for each weak binary classifier. The trainer may be configured to generate a first weighting input for a first weak binary classifiers and subsequent weighting inputs for subsequent weak binary classifiers, the subsequent weighting inputs are configured to correct misclassifications associated with the first weighting input. The trainer may be configured to correct to non-idealities associated with the weak binary classifier. The trainer may be configured to perform Error Adaptive Classifier Boosting (EACB).

BRIEF DESCRIPTION OF THE FIGURES

FIG. 3A is a block diagram of a strong binary classifier (0-vs-1) using Error-Adaptive Classifier Boosting (EACB);

FIGS. 3B and 3C are graphs showing how comparator-based weak classifiers exhibit significant classification errors in simulations;

FIG. 10A is a block diagram of a binary classifier test setup; and

FIGS. 10B-10E are graphs showing the details of an experimental approach for validating the noise model (see, FIGS. 5A-5C), after input referring.

DETAILED DESCRIPTION

Disclosed herein is a binary classifier and an ensemble classification system based on dynamic comparators for direct inference from analog sensor data. Prior classification systems employ a basic architecture that receives an analog signal for classification. The signal is amplified via an instrumentation amplifier. The amplified signal is fed into an analog to digital converter (ADC). The ADC output is then subjected to a series of digital multiply and accumulate operations (MAC). The result of these amplification, ADC and MAC operations is a classification output.

In contrast, the circuitry disclosed herein reduces system complexity and energy consumption by using a comparator based architecture. This replaces the instrumentation amplifier, ADC and MAC operations with a new circuitry design that directly derives 1b decisions from analog inputs. A training algorithm is also disclosed that uses dynamic comparators (weighted multi-input comparators) consuming $CV^2$ energy to achieve a strong classifier.

Figure 1A:
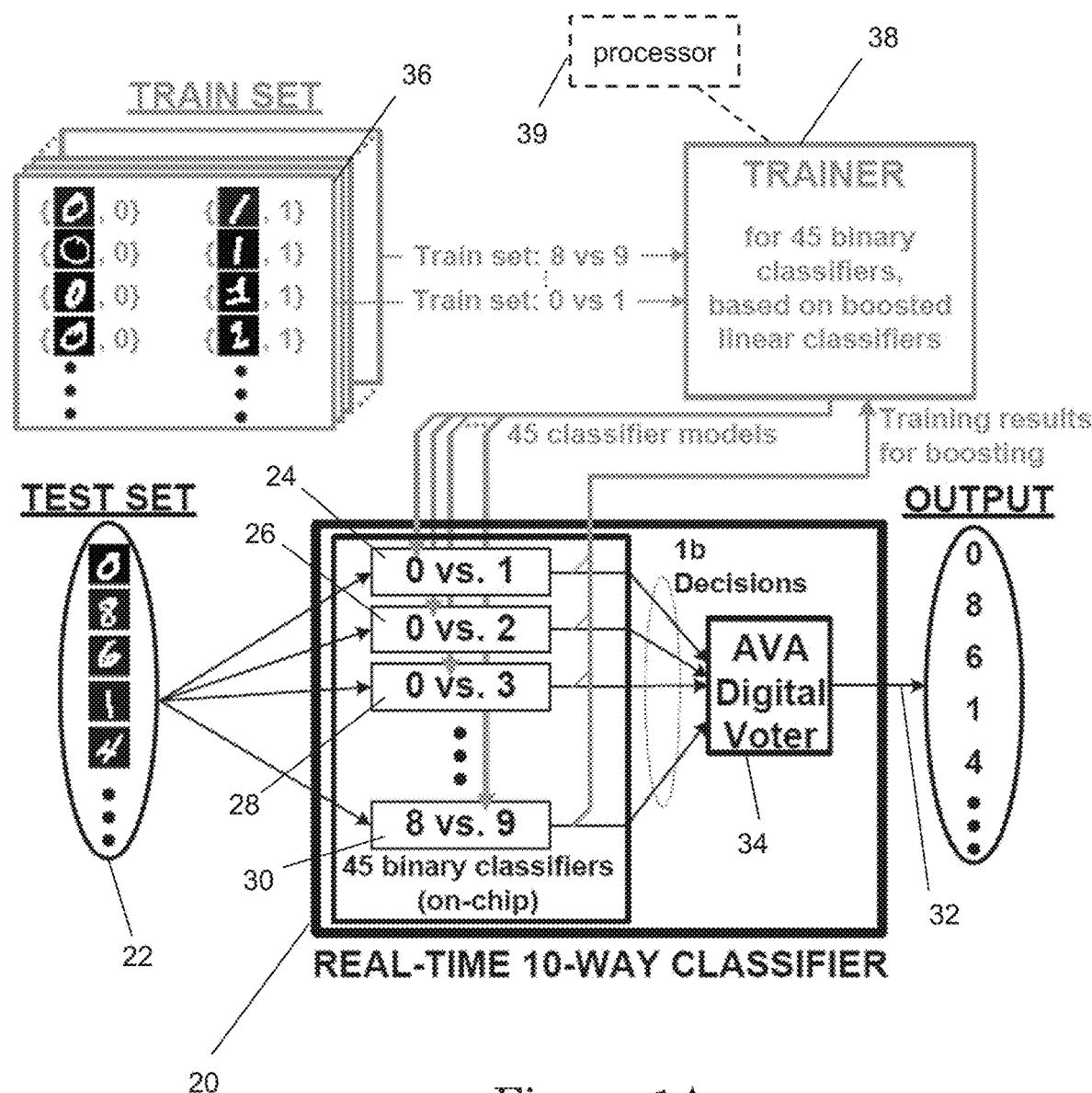
FIG. 1A is block diagram of a 10-way classifier that takes raw pixels as inputs and performs 0-9 numeric digit recognition.

FIG. 1A is block diagram of an ensemble classifier, in this case a 10-way classifier 20. The 10-way classifier 20 takes raw pixels from an image input shown generally by reference number 22 and performs 0-9 numeric digit recognition. In this example, the 10-way classifier is configured to recognize hand written digits based on the Mixed National Institute of Standards and Technology database (MNIST dataset). In this example, the classifier output 32 is a 3-bit digital output that identifies the numeric digit (0-9) that corresponds to the image input 22. The system includes a plurality of binary classifiers shown generally by reference numbers 24, 26, 28 and 30. It should be understood that 45 binary classifiers are required to perform 0-9 numeric digit recognition from the input image 22. The outputs of all 45 binary classifiers is coupled to an all-vs-all (AVA) digital voter 34, corresponding to all pairs of digits. The classifier circuit noise is modeled and experimentally validated.

In general, the binary classifiers must be trained using training data as shown generally by reference number 36. The training data basically contains the correct answer under a variety of conditions. This is generally known as a target or target attribute. Training is an iterative process that maps the input data attributes to the target (the answer that you want to predict). The training process ultimately develops a classifier model as generally shown by reference number 38. It should be understood that the trainer 38 may be implemented with a processor as generally shown by block 39. The classifier model includes weighting values that are provided as inputs to each binary classifier.

Figure 1B:
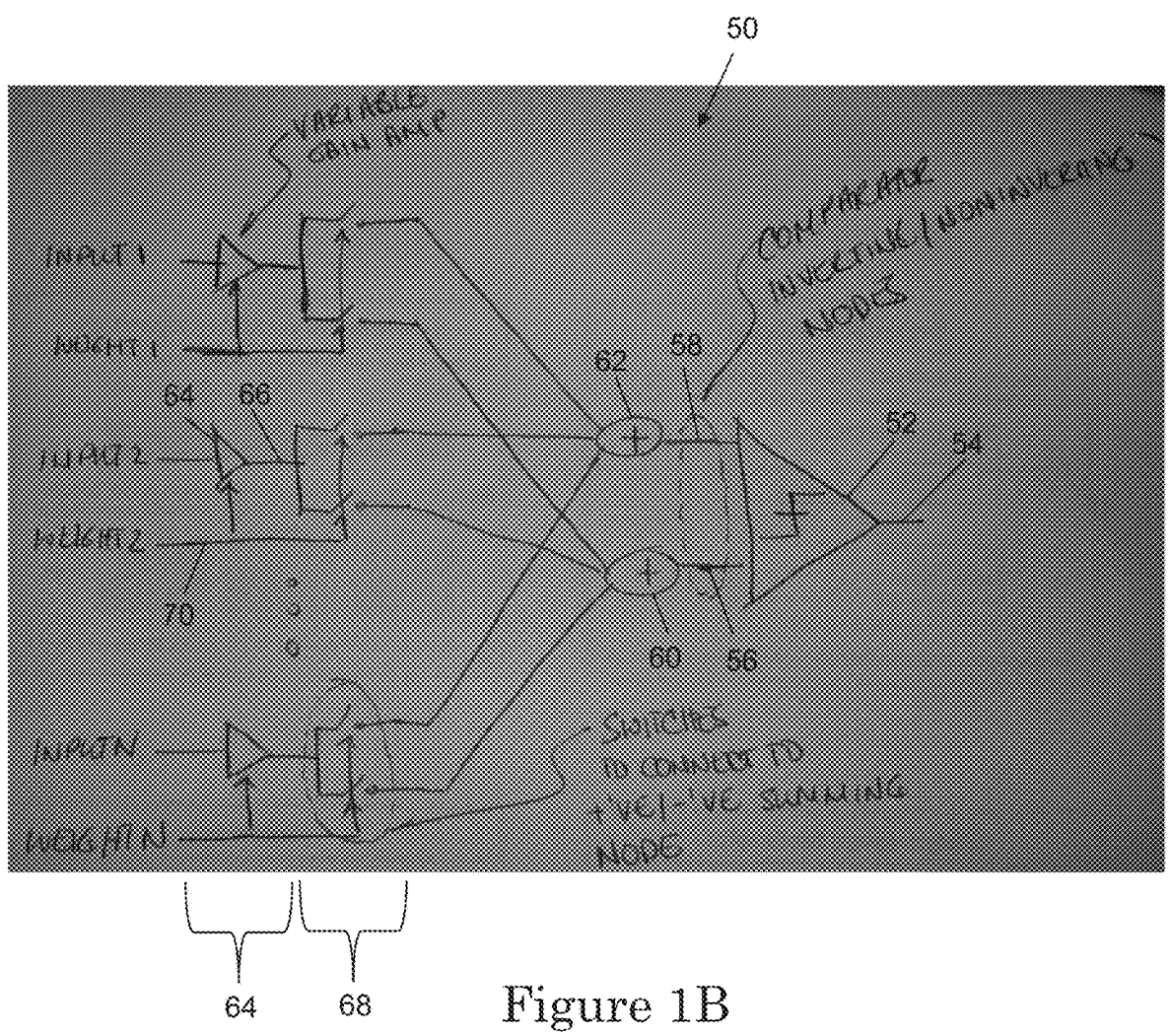
FIG. 1B is a block diagram of a binary classifier with a dynamic comparator structure.

FIG. 1B is a basic block diagram of a weak binary classifier 50 with a weighed multi-input comparator structure. This structure consumes minimal energy compared to traditional approaches. The binary classifier includes a comparator 52 generally configured to receive a positive input signal for classification 56 and a negative input signal for classification 58 and generate a single bit classification output 54. The positive input signal for classification 56 is generated via positive summing node 60. The negative input signal for classification 58 is generated via negative summing node 62.

The weak binary classifier 50 includes a plurality of weighting amplifiers stages 64 each having an output 66 coupled to a polarity switch 68. Each weighting amplifier stage 64 includes an input 72 coupled to a plurality of input signals for classification. For example, if an image for classification contained 100 pixels, 100 weighting amplifiers stages would be provided or allocated, each weighting amplifier stage is associated with a single pixel. The polarity switch 68 of each weighting amplifier stage is configured to couple the weighting amplifier stage output 66 to either the positive summing node 60 or negative summing node 62. Each weighting amplifier stage 64 includes a weighting input 70 configured to receive a weighting value from the classifier model. It should be understood that the weighting value may be positive or negative. Accordingly, the weighting value is used to weight (change the amplitude of) the input signal for classification and also control the polarity switch 68 so that the weighting amplifier stage output 66 is coupled to either the positive summing node 60 or negative summing node 62. The comparator 52 generally compares the sum of all positive weighted input signals 56 (coupled to the non-inverting input of the comparator) and the sum of all negative weighted input signals 58 (coupled to the non-inverting input of the comparator) and generate a single bit classification output 54 representing whether or not the input signals matches a specific pattern (set by the weighting value via weighting input 70).

Figure 2A:
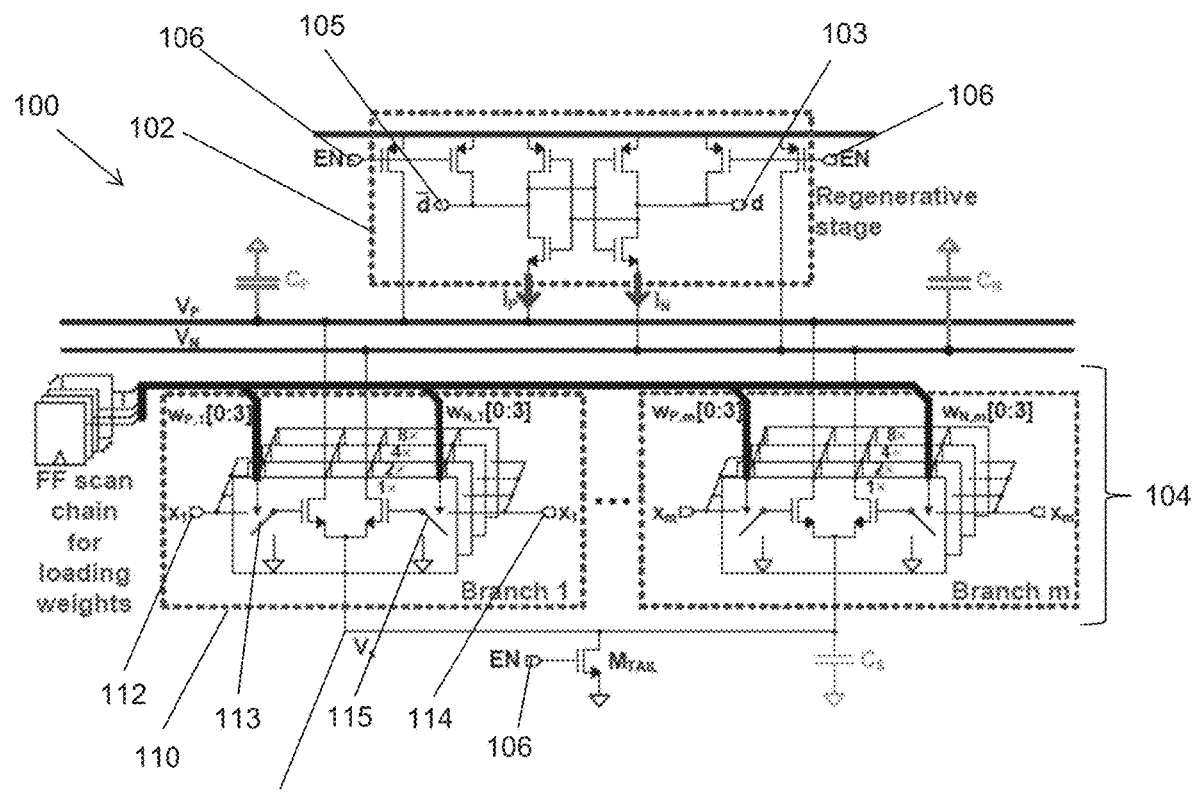
FIG. 2A is a block diagram showing more detailed implementation of a weighted multi-input comparator configured to operate as a weak binary classifier.

FIG. 2A is a block diagram includes showing more detailed implementation of a weighted multi-input comparator 100 configured to operate as a weak binary classifier. This example is a weak-classifier implementation based on a dynamic comparator structure, wherein configurable NFET branches are biased in velocity saturation. The weighted multi-input comparator 100 includes a comparator stage 102 (regenerative stage) configured to receive a plurality of positive and negative input signals for classification and generate a single bit classification output shown generally as differential outputs d (reference number 103) and $\bar{d}$ (reference number 105). The weighted multi-input comparator 100 also includes a plurality of weighting amplifier stages (branch stages) 104. Each weighting amplifier stage 104 includes a bank of weighting amplifier pairs for multiple bit positions, shown generally as 1×, 2×, 4× and 8×. Each bank includes a positive weighting amplifier and a negative weighting amplifier. In this example, the weighting value is 4 bits in length. Accordingly, weighting amplifier circuitry is provided for the 1, 2, 4 and 8 bit position. If a weighting value of 1001 binary is generated in training, the weighting amplifiers for 1× and 8× bit position are energized via positive switch 113 or negative switch 115 depending on the polarity of the weighting value. It should also be understood that a weighting amplifier stage may include a positive signal input 112 and negative signal input 114 that is used to control positive switch 113 and negative switch 115. It should be understood for non-zero weighting values, if positive switch 113 is coupled to the input signal then negative switch 115 is coupled to ground. Similarly, if positive switch 113 is coupled to the ground then negative switch 115 is coupled to the input signal. For weighting values of zero, the positive switch 113 and negative switch 115 may be coupled to ground.

Figure 2B:
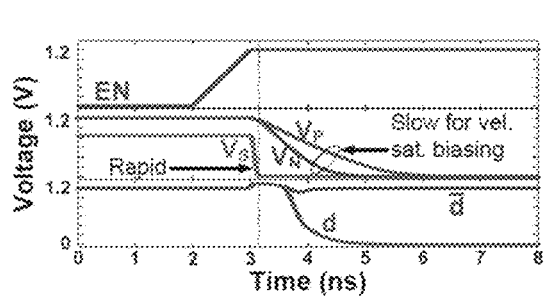
FIG. 2B is a graph of voltage vs. time for the EN, $V_P$, $V_N$, $V_S$, d and $\overline{d}$ function for the circuitry shown in FIG. 2A.
Figure 2C:
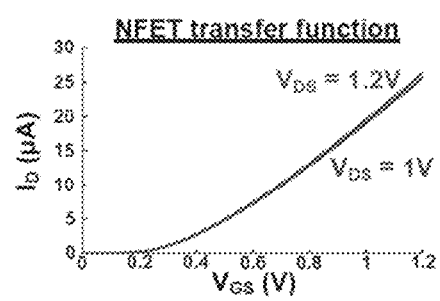
FIG. 2C is a graph of an NFET transfer function for the circuitry shown in FIG. 2A.

In this example, the branch stage is configured for m=48 branches to implement binary linear classification over m features. Each weighting amplifier stage 104 is implemented using a plurality of binary-weighted N-channel field effect transistors (NFETs), whose gate voltages are digitally configurable to ground or an analog input via weighting switches 113, 115. This way each branch can drive either the positive or negative summing node ($V_P/V_N$) with configurable weighting (configuration via gate voltage avoids series switches, reducing area and capacitance variation on ($V_P/V_N$). Following assertion of the EN input 106, the source node $V_S$ 108 is pulled down rapidly, due to sizing of the tail device $M_{TAIL}$. On the other hand, $V_P/V_N$ are pulled down relatively slowly by the aggregate branch currents due to sizing of the branch NFETs. FIG. 2B is a graph of voltage vs. time for the EN, $V_P$, $V_N$, $V_S$, d and $\bar{d}$ function for the circuitry shown in FIG. 2A. FIG. 2C is a graph of an NFET transfer function for the circuitry shown in FIG. 2A. With branch NFETs biased to be primarily in velocity saturation, roughly linear relationship is achieved between analog inputs and branch currents $I_P/I_N$. Thus, representing the analog inputs as the vector $\vec{x}$ and the (signed) configuration of NFETs as the weight vector $\vec{w}$, a linear classifier is implemented: y=sign ($\vec{w}\cdot\vec{x}$+b), where $\vec{w}$ and b are derived from training, and b can be set by statically biasing the input of one or more branches with appropriately configured weighting. Since summing/source-node capacitances ($C_P/C_N/C_S$) dominate, the energy per classification is approximately $[C_P V_{DD} + C_N V_{DD} + C_S(V_D - Vt,n)]V_{DD}$.

Though the energy can be very low, the disclosed classifier poses three issues in the system: (1) weak linear classifiers cannot fit complex training data (insufficient for binary classification between digits); (2) implementations based on a dynamic comparator suffers from numerous analog non-idealities; and (3) the number of binary-weighted NFETs in each branch (i.e., resolution of $\vec{w}$'s elements) causes exponentially increasing energy and area.

The issues of (1) insufficient fitting and (2) analog non-idealities are overcome using the concept of Error-Adaptive Classifier Boosting (EACB).

FIG. 3A shows a strong binary classifier 200 (0-vs-1) using EACB. The strong binary classifier 200 includes a trainer 202 and a plurality of weak binary classifiers 208, 210, 212. In this example only 3 weak binary classifiers are shown. It should be understood that the number of weak binary classifiers may be varied depending on the application. The outputs of all weak binary classifiers are coupled to a digital voter 214 which generates a classification output 216. It should be understood that the trainer 202 may be implemented with a processor as generally shown by block 202. As explained above, for a multi-class classifier for digit recognition, e.g., digits 0-9, as shown in FIG. 1A, 45 binary classifiers are required to generate the necessary inputs for the digital voter 34 and ultimately generate the classifier output 32. FIG. 3a is generally implemented with a plurality of weak binary classifiers that are grouped to form a strong binary classifier (ensemble). Error Adaptive Classifier Boosting (EACB) is used for training the strong binary classifier. In general, Adaptive Classifier Boosting (ACB) allows for intelligent combination of weak binary classifiers. A first weak classifier is trained. A subsequent weak classifier is then trained while emphasizing the training errors from the first classifier as shown generally by the dashed line linking the weak binary classifiers 208, 210, 212 to the trainer 204. As subsequent weak classifiers are trained in an iterative process, the ensemble of weak classifiers becomes successive stronger as more weak binary classifiers are trained. This approach adaptively improves the overall classifier. Any misclassifications from earlier trained weak binary classifiers are corrected later trained weak binary classifiers. In effect, this approach provides an almost perfectly fitting strong classifier across all training iterations. EACB relies on a machine-learning algorithm known as Adaptive Boosting (AdaBoost). EACB overcomes circuit non-idealities in weak-classifier implementations.

Adaptive Boosting generally targets fitting errors in the weak classifiers. In Error Adaptive Classifier Boosting (EACB) addresses not only fitting errors but also errors due to non-ideal behavior of the weak classifiers. EACB uses iterative training based on the errors of the prior iteration but also takes into account the non-ideal aspects of the hardware implementation. This training approach coordinates well with the low energy analog weak classifier implementations disclosed above since these implementations include specific forms of non-idealities. FIGS. 3B and 3C are graphs showing how comparator-based weak classifiers exhibit significant classification errors in simulations. In AdaBoost, a strong classifier capable of fitting to arbitrary training data is achieved by weighted linear summation of decisions from multiple (J) weak classifiers: $\Sigma_{j=1}^{J} z_j d_j$.

The weak classifiers are trained iteratively, in a manner that adapts to the fitting errors. EACB exploits this to also adapt to errors arising due to static hardware non-idealities in the previous iterations of weak classifiers. The theory of AdaBoost notes that a strong classifier can be achieved with extremely weak classifiers, making it possible for EACB to overcome severe analog non-idealities affecting the dynamic comparator (e.g., NFET variations, NFET transfer-function nonlinearity, $C_P/C_N$ mismatch, charge-injection errors, etc.). The effect such errors would have is shown in FIG. 3A, comparing the testing error of an ideal (0-vs-1) linear classifier, a MATLAB model of the comparator structure with device variations (extracted from transistor Monte Carlo simulations), and a transistor-level circuit model (post-layout) without device variations. Further disclosure on EACB is available in Zhuo Wang et al., *Error Adaptive Classifier Boosting (EACB): Leveraging Data-Driven Training Towards hardware Resilience for Signal Inference*, Circuits and Systems I: Regular Papers, IEEE Transactions on (Volume: 62, Issue: 4), April 2015; which is incorporated herein by reference in its entirety.

Figures 4A, 4B, 4C:
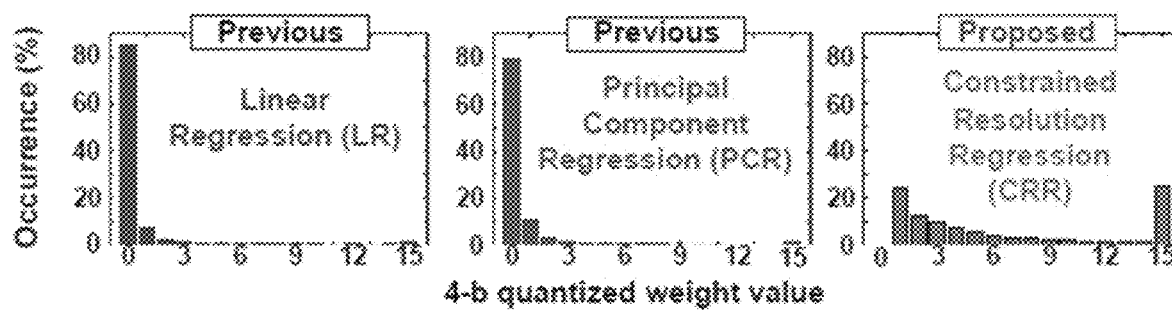
FIGS. 4A-4C are graphs showing examples of Linear Regression (LR) and Principal Component Regression (PCR)
Figure 4D:
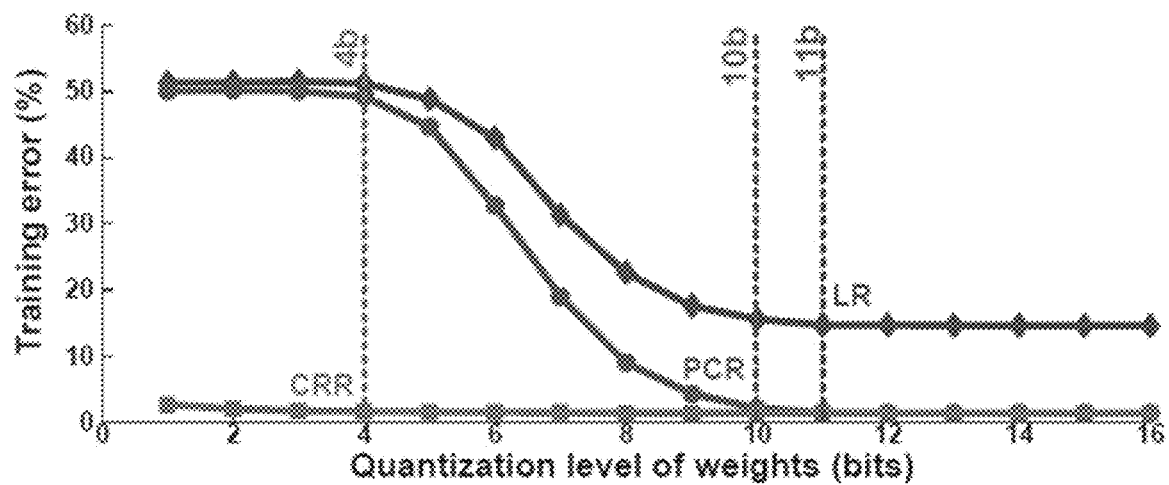
FIG. 4D is a graphs showing Constrained Resolution Regression (CRR) for training to substantially reduce resolution required of linear-classifier weights.

Regarding the resolution of $\vec{w}$'s elements, standard algorithms for training linear classifier [e.g. Linear Regression (LR) and Principal Component Regression (PCR), which mitigates co-linearity during training] lead to required resolution >10b. FIGS. 4A-4B are graphs showing examples of LR and CRR. These graphs show the distribution of weight values when quantized to the 4-bit level. In these examples, the majority of the weights fall into the zero quantization level (signifying significant rounding errors associated with a 4-bit level of quantization). This suggests the need for a larger dynamic range for the weight. This in turn would require a large number of bits for the weight. However, an increase in the number of bits for the weight would require an exponential increase in area for the hardware for implementation. This is very costly for an analog implementation. In the alternative, FIG. 4D is a graph showing Constrained Resolution Regression (CRR) for training to substantially reduce resolution required of linear-classifier weights. CRR enables resolution of just 4-bits without performance degradation. The reason for this is commonly encountered, and is illustrated in FIGS. 4A-4D via histograms of $\vec{w}$'s elements (over all 45 binary classifiers) for the case of 4-bit resolution. Namely, large-valued elements cause many other elements to be negated following quantization. To substantially reduce the resolution required and thus the overall energy/area, we introduce a training algorithm, referred to as Constrained Resolution Regression (CRR), where such negation is explicitly avoided by optimization. CRR basically creates a cost function that is optimized to find weights such that when applied to input data will yield as good a mapping of the input data labels to the actual input data as possible. For example, the labels may be the digits 0-9 and the input data may be the actual pixels values. The cost function is optimized to minimize the error between the training model and the label values.

As shown in FIGS. 4A-4D, this is achieved by adding the following optimization constraint: $\alpha \leq |w(i)| \leq (2^k-1)\alpha$, where k is the resolution of $\vec{w}$+s elements $w(i)$, and $\alpha$ is a scaling parameter added to be optimized. However, the constraint $|w(i)| \geq \alpha$, is non-convex, making the optimization unsolvable via routine quadratic programming. Thus, we introduce binary variables $\vec{b} \in \{0,1\}^m$, and reformulate the constraint to: (1) $-15\alpha \leq w(i) \leq 15\alpha$; (2) $w(i)+c \cdot b(i) \geq \alpha$; (3) $w(i)+c \cdot (b(i)-1) \leq -\alpha$, where the constant c is chosen to ensure a value larger than $\alpha+|w(i)|$. FIG. 4B shows the resulting histogram and classifier performance vs. resolution. CRR achieves performance at the level of ideal precision with just a 4-bit resolution.

Figure 5A:
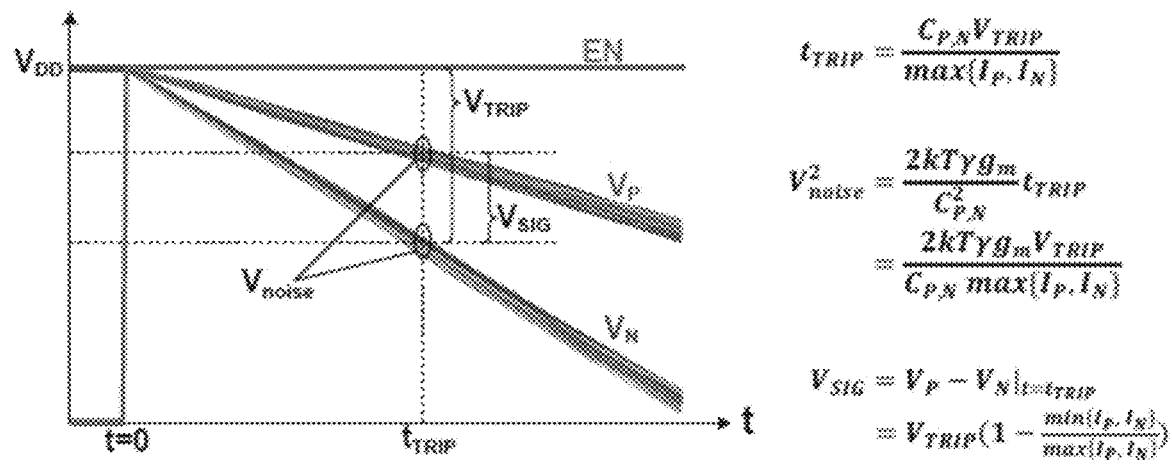
FIGS. 5A-5C are graphs of noise modeling of comparator-based classifier, showing low decision-error probability due to noise is achieved for MNIST images.
Figure 5B:
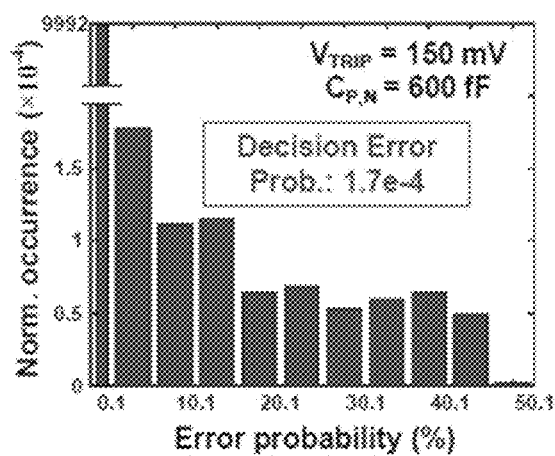
Figure 5C:
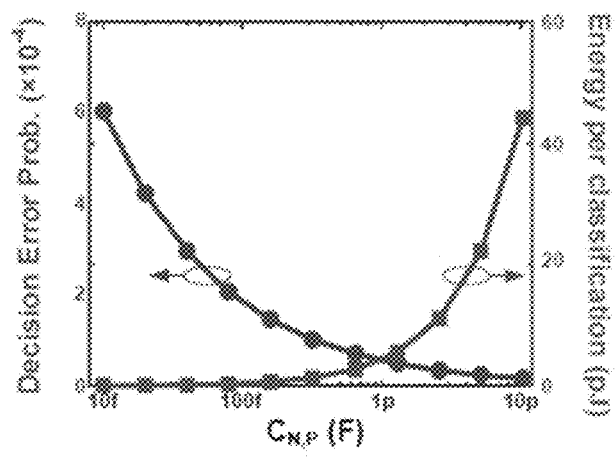
Figure 6A:
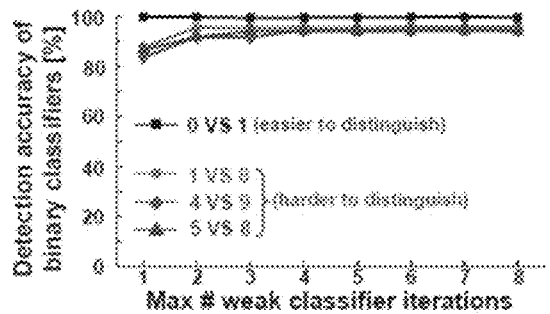
FIGS. 6A-6D are measurement summary graphs showing performance gains due to EACB and CRR.
Figure 6B:
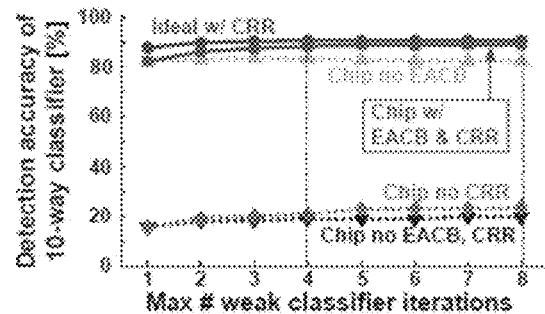
Figure 6C:
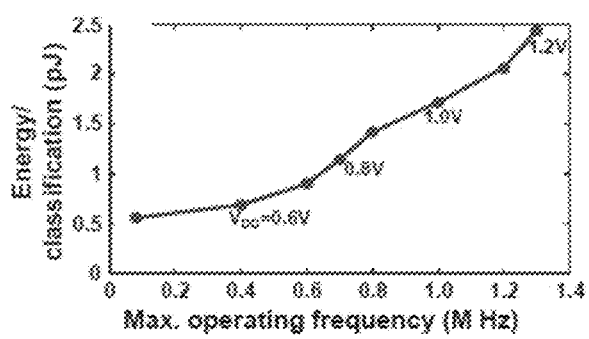
Figure 6D:
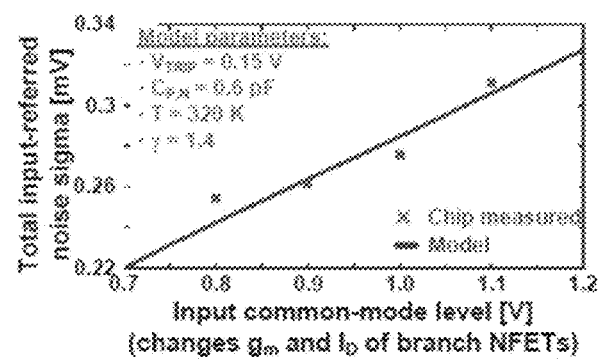

For circuit noise, the appeal of a comparator is that its dominant time constant can be designed to be infinity (i.e., $I_P/I_N$ integrate on $C_P/C_N$ to set $V_P/V_N$). For a required output voltage, this enables the fastest response time and smallest noise-bandwidth at a given transconductance (linear amplifiers incur dominant-pole settling, necessitating increased noise-bandwidth by lowering resistance and increasing transconductance, for a required output). FIGS. 5A-5C show the comparator's predicted noise variance $V_{noise}^2$ (integrator model) on the summing nodes $V_P/V_N$. The parameter $V_{TRIP}$ represents the drop on $V_P/V_N$ that triggers regeneration. Thus, it sets both the noise integration time $t_{TRIP}$ [along with the ratio $(C_{P,N}/\max\{I_P,I_N\})$], and the differential signal $V_{SIG}$ [along with the ratio $(\min\{I_P,I_N\}\max\{I_P,I_N\})$].

Using these expressions (assuming Gaussian noise) and employing a gate-voltage to drain-current transfer function for the NFETs (FIG. 2), the decision-error probability due to noise can be computed for any set of analog inputs. FIGS. 5A-5C are graphs of noise modeling of comparator-based classifier, showing low decision-error probability due to noise is achieved for MNIST images. FIG. 5B shows a histogram of error probability over all 45 binary classifiers and all images from the MNIST dataset; as seen, for $V_{TRIP} \approx 150$ mV and $C_{P/N} \approx 600$ fF from simulations), the decision-error probability is low, having average value 1.7e-4. In addition to superior noise/bandwidth efficiency compared To conventional linear amplifiers, the comparator eliminates the need for explicit instrumentation on each branch. While a conventional system would require an amplifier for each input feature (causing proportional power increase), the comparator's noise is set by the capacitance $C_{P/N}$ of shared nodes. $C_{P/N}$ is a designer parameter to further reduce noise at an energy cost. $C_{P/N}$ presents a designer parameter can $V_{TRIP}$ through some circuit modification), giving the noise/power tradeoff shown in FIG. 5A for the MNIST dataset.

Figure 7:
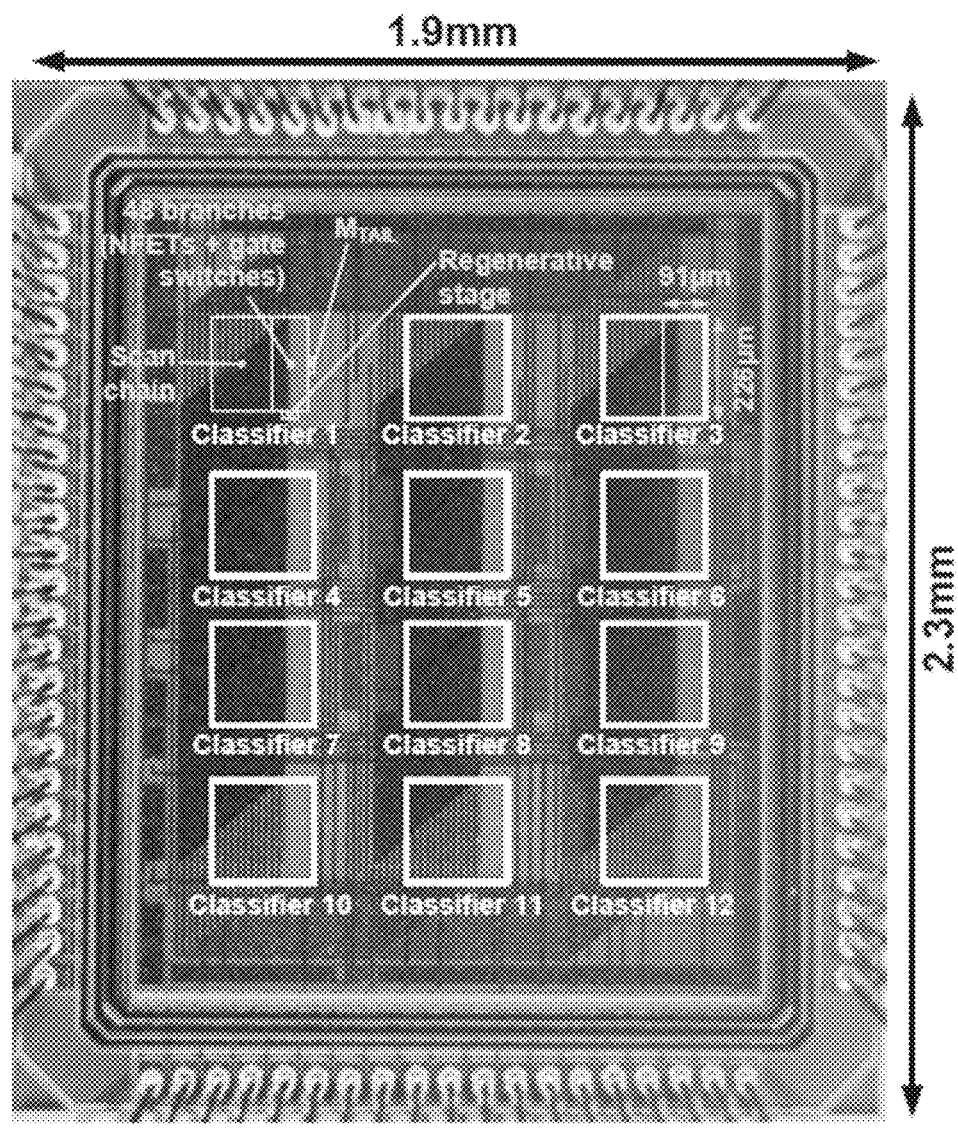
FIG. 7 is a die photograph of an integrated circuit (IC) of a plurality of binary classifiers as disclosed herein, implemented in 130 nm CMOS.

The classifier is implemented in 130 nm CMOS (FIG. 7) and tested by feeding analog pixels from MNIST images via 16b DACs. The IC consists of 12 comparator-based linear classifiers and a shift register to load weight vectors $\vec{w}$'s. 1b decisions are output, and linear summation for EACB as well as AVA voting is off chip (corresponding to 12-bit signed digital addition and 10 4-bit counters). This enables any number of weak-classifier iterations for experimentation.

FIGS. 6A-6D are measurement summary graphs showing performance gains due to EACB and CRR; 32× lower energy is achieved than convention system (ADC and digital MAC, with resolutions optimized for MNIST digit recognition). Significant boosting is observed over the 45 binary classifiers (few examples shown). EACB and CRR greatly improve overall digit recognition to an accuracy of 90% (near ideal system), using an average of 4.4 weak classifiers per binary classifier. At VDD=1.2V, the speed is 1.3 MHz and total energy (all binary classifiers) is 534 pJ/decision, representing 32× reduction from a conventional system [i.e., 5b ADC (required from simulations) at 3.2 pJ and 11b MACs at 2.78 pJ (from post-layout simulations)]. The noise model is verified using slow ramp inputs to the comparator, and varying their DC level (which varies $g_m$ and $I_P/I_N$); good agreement is observed, with an input referred noise σ over all inputs of 280 μV.

Figure 8A:
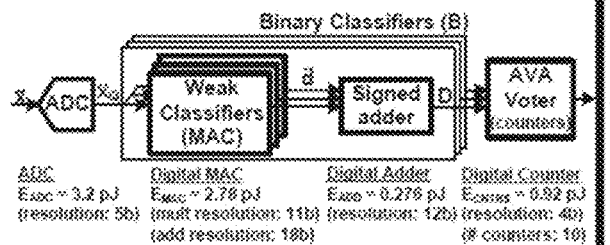
FIGS. 8A and 8B are block diagrams showing an energy analysis of disclosed binary classifier versus a conventional system (based on ADC and digital MACs)
Figure 8B:
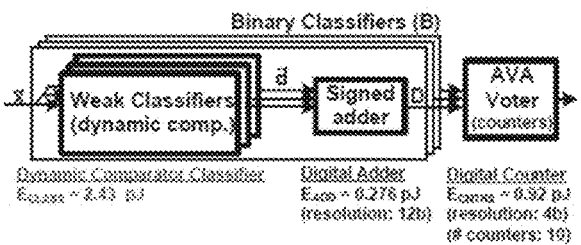
Figures 9A, 9B, 9C:
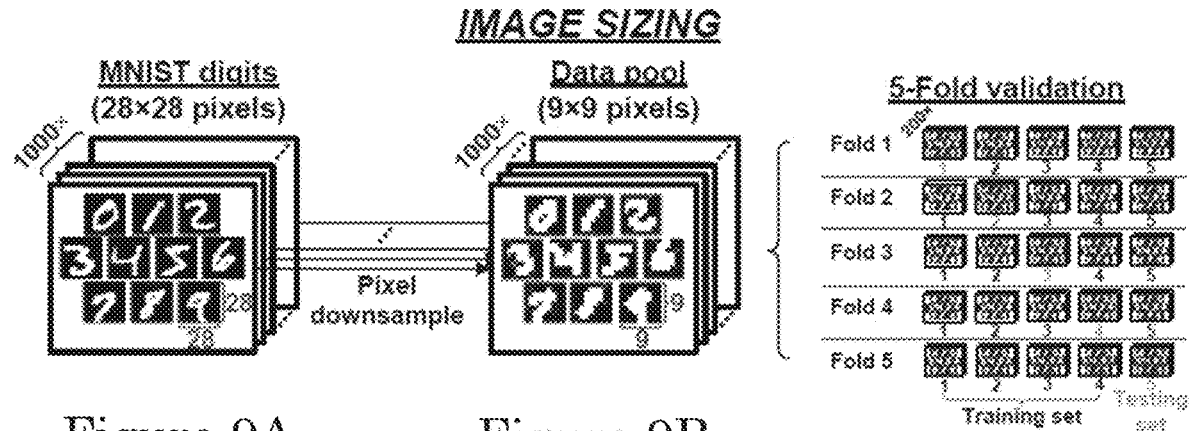
FIGS. 9A-9G are block diagrams showing the details of an experimental binary classifier setup.
Figure 9D:
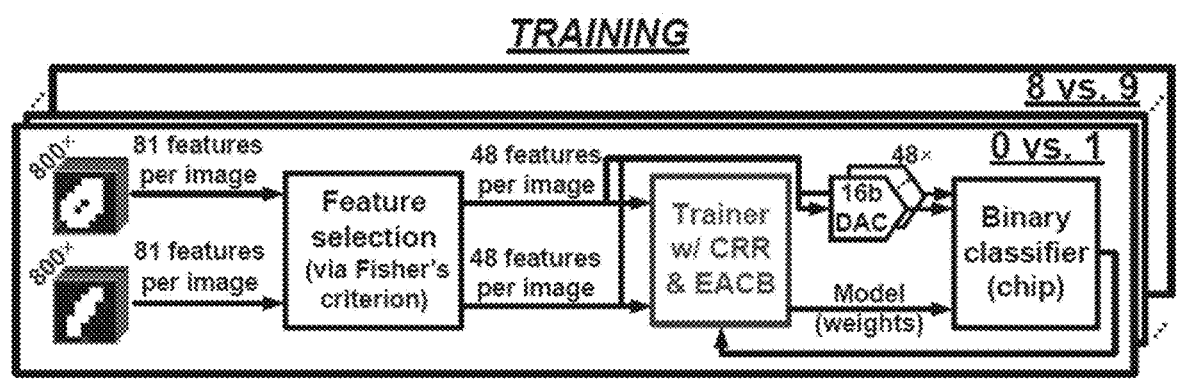
Figures 9E, 9F, 9G:
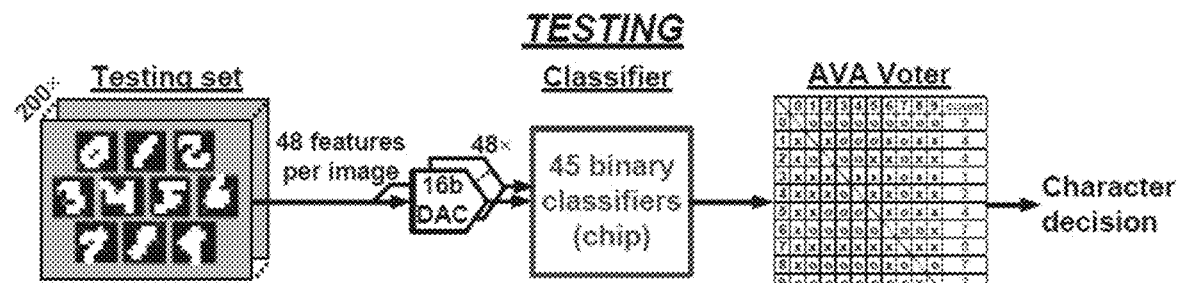

FIGS. 8A and 8B are block diagrams showing an energy analysis of disclosed binary classifier versus a conventional system (based on ADC and digital MACs). The component resolutions required are determined from finite-precision simulations in MATLAB, and all component energies assume supply voltage of 1.2V and implementation in 130 nm CMOS, with values taken from measured chips (previously reported) or from post-layout simulations. Weak-classifier outputs from the conventional system and the demonstrated system are fed to digital adders (for EACB) and then digital counters (for all-vs.-all voting). Note, instrumentation amplifiers are not considered, but in a system requiring these, even greater energy savings are expected.

FIGS. 9A-9G are block diagrams showing the details of an experimental binary classifier setup. For input data, the prototype IC supports up to m=48 features, so images from the MNIST dataset are resized from 28×28 pixels to 9×9 pixels (limited degradation in digit detection performance is verified), and then further down selecting from 81 to 48 features, using the widely employed Fisher's criterion for feature selection. Following this, 5-fold validation training/testing is performed, by feeding the features to the prototype IC via 16b DACs.

FIG. 10A is a block diagram of a binary classifier test setup. FIGS. 10B-10E are graphs showing the details of an experimental approach for validating the noise model (see, FIGS. 5A-5C), after input referring. A comparator-based classifier is configured to have 24 active positive and negative branches each with weight value of 7, and the positive and negative inputs are driven by a slow stair-case ramp using the DAC (with steps and noise verified to be below the noise of the comparator structure). By performing 10 k comparisons at each step (to derive the probability of output decision d being '1'), the offset and variance (due to noise) is determined. Doing this for various input common-mode levels changes the $g_m$ and $I_D$ of the NFET branches, enabling validation of the noise model.

Any and all references listed herein are also part of the application and are incorporated by reference in their entirety as if fully set forth herein including: J. Zhang, Z. Wang, and N. Verma, "A Matrix Multiplying ADC Implementing a Machine-learning Classifier Directly with Data Conversion," ISSCC Dig. Tech. Papers, February 2015, pp. 332-333; [2] Z. Wang, R. Schapire and N. Verma, "Error-adaptive Classifier Boosting (EACB): exploiting data-driven training for highly fault-tolerant hardware," Proc. of ICASSP, May 2014, pp. 3884-3888; R. E. Schapire and F. Yoav, Boosting: Foundations and Algorithms, MIT Press, 2012; T. Sepke, et al., "Noise Analysis for Comparator-based Circuits," IEEE TCAS-I, vol. 56, no. 3, pp. 541-553, March 2009.

It should be understood that many variations are possible based on the disclosure herein. Although features and elements are described above in particular combinations, each feature or element can be used alone without the other features and elements or in various combinations with or without other features and elements.

What is claimed is:

1. A strong binary classifier comprising:
   a plurality of weak binary classifiers, each comprising:
      a plurality of weighting amplifier stages, each weighting amplifier stage configured to receive an input signal for classification and generate a weighted input signal;
      a positive summing node and a negative summing node coupleable to the plurality of weighting amplifier stages, the positive summing node configured to generate a positive input signal for classification based on positive-weighted input signals generated from the plurality of weighting amplifier stages, the negative summing node configured to generate a negative input signal for classification based on negative-weighted input signals generated from the plurality of weighting amplifier stages; and
      a comparator coupled to the positive summing node and negative summing node, the comparator configured to compare a sum of the positive-weighted input signals and a sum of the negative-weighted input signals to generate a weak classification output;
   a digital voter coupled to the plurality of weak binary classifiers, the digital voter configured to generate a strong classification output based on the plurality of weak classification outputs; and
   a trainer coupled to the plurality of weak binary classifiers, the trainer configured to iteratively train the plurality of weak binary classifiers based on incorporating a non-convex optimization constraint reformulated to be solvable via quadratic programming into generating the weighted input signals to constrain a precision of the weights applied to the input signals.

2. The strong binary classifier of claim 1 wherein the trainer is further configured to train subsequent weak binary classifiers while taking into account any training errors from training prior weak classifiers to correct misclassifications.

3. The strong binary classifier of claim 1 wherein the trainer is further configured to perform Error Adaptive Classifier Boosting (EACB) to iteratively train the plurality of weak binary classifiers and take into account non-ideal aspects of hardware implementing the weak binary classifiers.

4. The strong binary classifier of claim 1, wherein each weighting amplifier stage further comprises a positive signal input and a negative signal input to control whether the weighting amplifier stage is coupled to the positive summing node or the negative summing node.

5. The strong binary classifier of claim 1, wherein each weighting amplifier stage further comprises a positive weighting amplifier and a negative weighting amplifier associated with a bit position of a weighting value derived from a classifier model.

6. The strong binary classifier of claim 1, wherein noise of each comparator is set by a capacitance of corresponding positive and negative summing nodes.

7. The strong binary classifier of claim 1, wherein the trainer is further configured to iteratively train the plurality of weak binary classifiers based on a constrained resolution regression that creates a cost function to reduce resolution required of the weights applied to the input signals.

8. The strong binary classifier of claim 1, wherein the trainer is further configured to reduce features based on Fisher's criterion.

9. A method of performing classification using a strong binary classifier, the method comprising:
   generating a plurality of weak classification outputs via a plurality of weak binary classifiers, each generation of a weak classification output comprising:
      generating a weighted input signal from a received input signal for classification via a plurality of weighting amplifier stages;
      generating a positive input signal for classification based on positive-weighted input signals generated from the plurality of weighting amplifier stages via a positive summing node;
      generating a negative input signal for classification based on negative-weighted input signal generated from the plurality of weighting amplifier stages via a negative summing node;
      comparing a sum of the positive-weighted input signal and a sum of the negative-weighted input signal via a comparator;
   generating a strong classification output based on the plurality of weak classification outputs via a digital voter; and
   iteratively training the plurality of weak binary classifiers via a trainer based on incorporating a non-convex optimization constraint reformulated to be solvable via quadratic programming into generating the weighted input signals to constrain a precision of the weights applied to the input signals.

10. The method of claim 9 further comprising training via the trainer subsequent weak classifiers while taking into account any training errors from training prior weak classifiers to correct misclassifications.

11. The method of claim 9 further comprising performing via the trainer Error Adaptive Classifier Boosting (EACB) to iteratively train the plurality of weak binary classifiers and take into account non-ideal aspects of hardware implementing the weak binary classifiers.

12. The method of claim 9, wherein each generation of a weak classification output further comprises controlling via a positive signal input and a negative signal input whether the weighting amplifier stage is coupled to the positive summing node or the negative summing node.

13. The method of claim 9, further comprising setting noise of each comparator by a capacitance of corresponding positive and negative summing nodes.

14. The method of claim 9, further comprising iteratively training the plurality of weak binary classifiers via a trainer based on a constrained resolution regression that creates a cost function to reduce resolution required of the weights applied to the input signals.

15. The method of claim 9, further comprising reducing features via a trainer based on Fisher's criterion.

16. A weak binary classifier configured to receive a plurality of input signals for classification and generate a weak classification output, the weak binary classifier comprising:
a plurality of weighting amplifier stages, each weighting amplifier stage configured to receive an input signal for classification and generate a weighted input signal;
a positive summing node and a negative summing node coupleable to the plurality of weighting amplifier stages, the positive summing node configured to generate a positive input signal for classification based on positive-weighted input signals generated from the plurality of weighting amplifier stages, the negative summing node configured to generate a negative input signal for classification based on negative-weighted input signals generated from the plurality of weighting amplifier stages; and
a comparator coupled to the positive summing node and negative summing node, the comparator configured to compare a sum of the positive-weighted input signals and a sum of the negative-weighted input signals to generate a weak classification output;
the weak binary classifier configured to be iteratively trained based on incorporating a non-convex optimization constraint reformulated to be solvable via quadratic programming into generating the weighted input signals to constrain a precision of the weights applied to the input signals.

17. The weak binary classifier of claim 16, further comprising a plurality of polarity switches, each polarity switch coupled to a corresponding weighting amplifier stage and configured to couple the weighted input signal of the corresponding weighting amplifier stage to the positive summing node or the negative summing node based on a polarity of the weighted input signal.

18. The weak binary classifier of claim 16, wherein the weak binary classifier is further configured to be iteratively trained based on Error Adaptive Classifier Boosting (EACB).

19. The weak binary classifier of claim 16, wherein the weak binary classifier is further configured to be iteratively trained based on a constrained resolution regression that creates a cost function to reduce resolution required of the weights applied to the input signals.

20. The weak binary classifier of claim 16, wherein the weak binary classifier is further configured to be iteratively trained based on a feature reduction via Fisher's criterion.

* * * * *